W. LABURDA.
ANIMAL TRAP.
APPLICATION FILED APR. 7, 1920.

1,380,108.

Patented May 31, 1921.

INVENTOR
Walter Laburda
BY
Harry Jacobson
ATTORNEY

UNITED STATES PATENT OFFICE.

WALTER LABURDA, OF COALTON, OKLAHOMA.

ANIMAL-TRAP.

1,380,108. Specification of Letters Patent. Patented May 31, 1921.

Application filed April 7, 1920. Serial No. 371,858.

*To all whom it may concern:*

Be it known that I, WALTER LABURDA, citizen of Poland, residing at Coalton, in the county of Okmulgee and State of Oklahoma, have invented certain new and useful Improvements in Animal-Traps, of which the following is a specification.

This invention relates to animal traps, being intended more particularly for embodiment in mouse and rat traps.

The invention has for an object to provide a novel and improved form of mouse and rat trap of simple and inexpensive construction.

For further comprehension of the invention, and of the objects and advantages thereof, reference will be had to the following description and accompanying drawings, and to the appended claims in which the various novel features of the invention are more particularly set forth.

Figure 1:
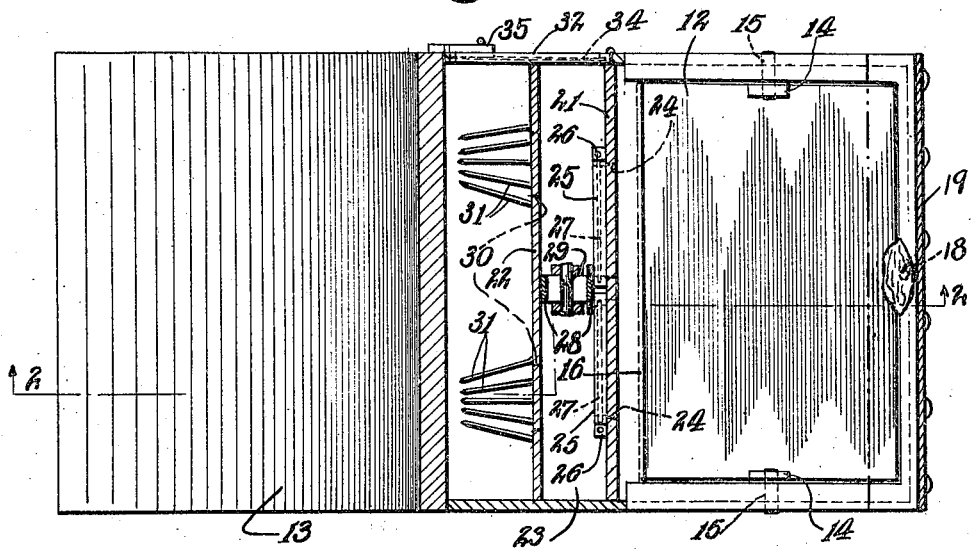
Figure 2:
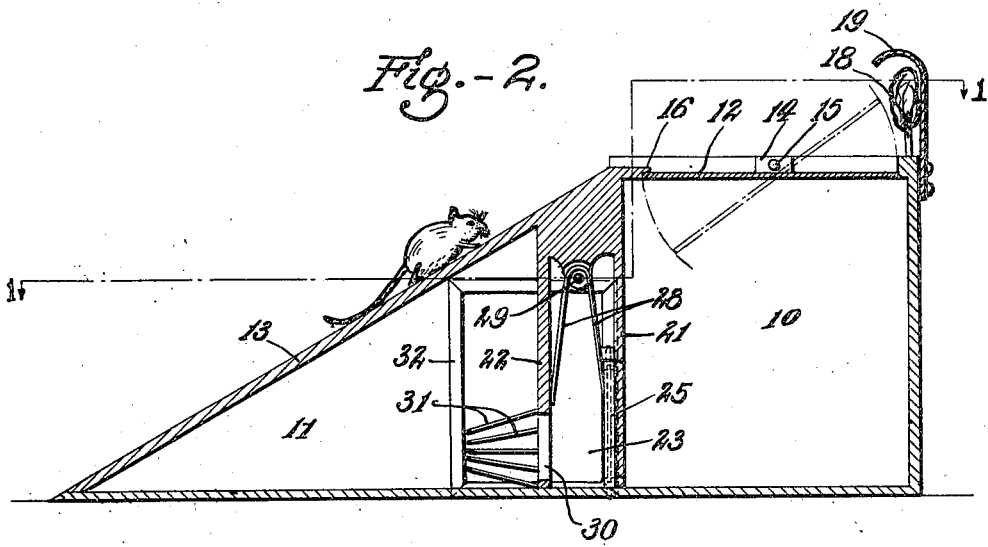

Figure 1 of the drawings is a horizontal sectional view of a mouse trap constructed according to my invention, this view being taken on the line 1—1 of Fig. 2.

Fig. 2 is a longitudinal vertical section taken on the line 2—2 of Fig. 1.

As here shown my improved trap comprises a box or receptacle which is divided transversely to form a rear compartment 10 and a front compartment 11, the rear compartment extending the full height of the box throughout its entire area and being provided with the trap door 12 at its top, while the top of the front compartment slopes downwardly to the front end of the trap to provide a runway 13 up which the mouse passes to reach the bait.

The trap door 12 is provided at opposite sides of the box with upturned lugs or ears 14 by which it is pivoted on pins 15 projecting inwardly from the sidewalls of the trap, the weight of the door causing it to automatically return to its horizontal or closing position as will be apparent, a lip 16 on the top edge of the runway projecting over the door and preventing the door from swinging pendulum fashion.

The bait is adapted to be placed on top of the trap at the rear thereof, a pin or hook 18 being fixed in the rear wall of the trap to support the bait and to prevent the bait from being reached except by crossing the door. A cage 19 surrounds the bait. As will be apparent the mouse passing up the runway, as indicated in Fig. 2, will step on the door 12 which will yield and cause the mouse to fall into the compartment 10.

The front wall of the compartment 10 is indicated at 21 and the rear wall of the compartment 11 is indicated at 22 and is located a short distance in front of the wall 21, providing a small intermediate compartment 23. The wall 21 has a pair of openings 24 normally closed by doors 25 hinged on their outer sides as at 26 and having glass panes 27 formed therein for the passage of light, these doors are normally urged to closed position by a flat spring 28 which is held in place by a pin 29 and bears at opposite ends on the partition 22 and the adjacent edges of the doors 25.

The wall 22 has formed therein a pair of openings 30 in juxtaposition to the doors 25 and extending forwardly from the edges of these openings are the converging spring spikes 31 which form a guard preventing the return of a mouse through either of these openings. Hinged to one of the side walls of the trap and extending partly across the front and intermediate compartments 11 and 23 is a door 32 provided with a light admitting glass pane 34 and locked by a latch 35.

The mouse which has fallen into the compartment 10 through the trap door 12 will be attracted by the light entering through the doors 25 and will push one of the latter outwardly and enter the intermediate compartment 23, the spring immediately closing the door, the mouse in his continued efforts to escape passing through the openings 30 into the forward compartment 11 from which it is removed when desired through the door 32. The mouse being thus attracted away from the compartment 10 any chance of escape through the trap door 12 when the latter is tilted by the entrances of another mouse is prevented.

Having thus described my invention what I claim as new and desire to protect by Letters Patent of the United States is as follows:—

1. A mouse trap having front and rear compartments and a relatively small intermediate compartment, a trap door forming the top of the rear compartment, hinged translucent doors leading from the rear compartment to the intermediate compartment, springs normally urging said doors to closed position, the rear wall of the front compartment having openings therein registering with the said doors, converging spikes extending forwardly from the edges of said openings, and a translucent door in the side wall of the trap registering with the front and intermediate compartments.

2. A mouse trap having front and rear compartments and a relatively small intermediate compartment, a trap door forming the top of the rear compartment, a pair of translucent doors leading from the rear compartment to the intermediate compartment said doors being hinged at the opposed edges, a flat spring normally engaging adjacent edges of each of said doors and urging said doors to closed position, the rear wall of the front compartment having openings therein registering with the said doors, converging spikes extending forwardly from the edges of said openings, and a translucent door in the side wall of the trap registering with the front and intermediate compartments, bait supporting means on top of the trap to the rear of said trap door, a cage inclosing said bait supporting means at the sides and rear, the top wall of the mouse trap in front of the trap door inclining downwardly to form a runway.

In testimony whereof I have affixed my signature, this second day of April 1920.

WALTER LABURDA.